US006785731B1

(12) United States Patent
Westberg et al.

(10) Patent No.: US 6,785,731 B1
(45) Date of Patent: Aug. 31, 2004

(54) METHODS FOR EFFICIENT TRANSMISSION OF SIGNALING MESSAGES IN A PACKET-BASED NETWORK

(75) Inventors: Lars Westberg, Enköping (SE); Niclas Lindberg, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/574,242

(22) Filed: May 19, 2000

(30) Foreign Application Priority Data

May 21, 1999 (SE) .......................................... 9901893-9

(51) Int. Cl.⁷ .............................................. G06F 15/16
(52) U.S. Cl. ..................................... 709/232; 709/228
(58) Field of Search .................................. 709/232, 235

(56) References Cited

U.S. PATENT DOCUMENTS

| 4,899,148 | A | * | 2/1990 | Sato et al. ..................... 341/65 |
| 5,023,610 | A | * | 6/1991 | Rubow et al. ................ 341/51 |
| 5,293,379 | A | | 3/1994 | Carr |
| 5,552,832 | A | | 9/1996 | Astle |
| 6,061,366 | A | * | 5/2000 | Seki et al. ................... 370/477 |
| 6,198,735 | B1 | * | 3/2001 | Pazhyannur et al. ........ 370/349 |
| 6,388,584 | B1 | * | 5/2002 | Dorward et al. ............. 341/51 |
| 6,529,512 | B1 | * | 3/2003 | Galand et al. .............. 370/400 |

FOREIGN PATENT DOCUMENTS

EP          0 701 354          3/1996

OTHER PUBLICATIONS

S. Casner, "Compressing IP/UDP/RTP Headers for Low-Speed Serial Links", *Cisco Systems v. Jacobson*, Cisco Systems, Network Working Group, XP–002121319, pp. 1–23, (Feb. 1999).

Jim Wang, et al., "Wireless Voice–over–IP and Implications for Third–Generation Network Design", *Bell Labs Technical Journal*, vol. 3, No. 3, pp. 79–97, XP–002121936 (Jul.–Sep. 1998).

Casner S. Jacobson V: "Compressing IP/UDP/RTP Headers for Low–Speed Serial Links", Network Working Group, Request for Comments: 2508, 'Online! Feb. 1999 (1999–02) pp. 1–22, XP002121319.

Jin Wang et al.: "Wireless Voice–Over–IP and Implications for Third–Generation Network Design" Bell Labs Technical Journal, Jul.–Sep. 1998, Lucent technologies, USA, vol. 3, No. 3, pp. 79–97, XP002121936.

* cited by examiner

*Primary Examiner*—David Wiley
*Assistant Examiner*—Scott M. Collins

(57) ABSTRACT

The present invention deals with the problem with packet based services consuming considerable bandwidth over links with shortage of bandwidth. The object of the present invention is to reduce the amount of information when transferring a signalling message and thus save bandwidth.

After receiving a signalling message in a first node the signalling message is identified. The signalling message is replaced by an indicator, under usage of information from the identification, which indicator is transferred to a second node. The second node restores the signalling message using the indicator.

7 Claims, 6 Drawing Sheets

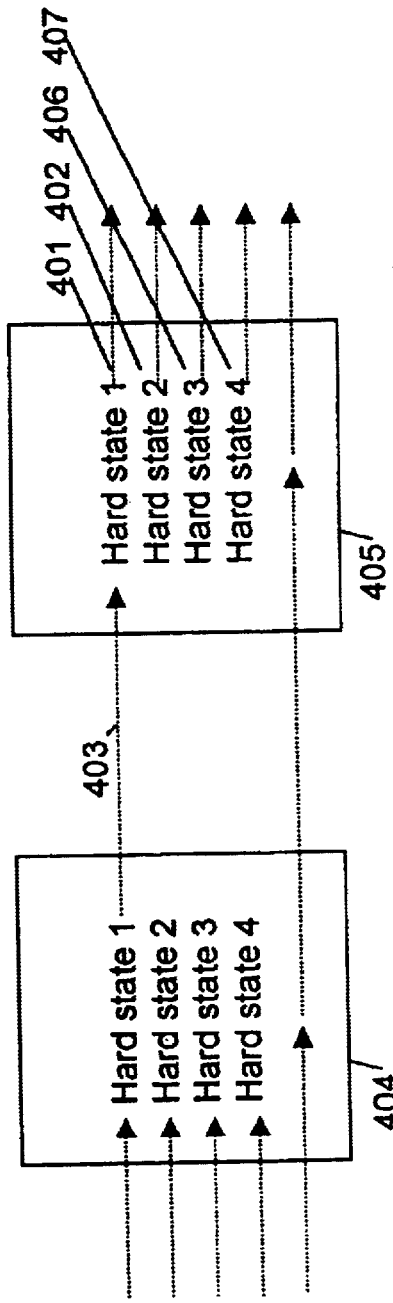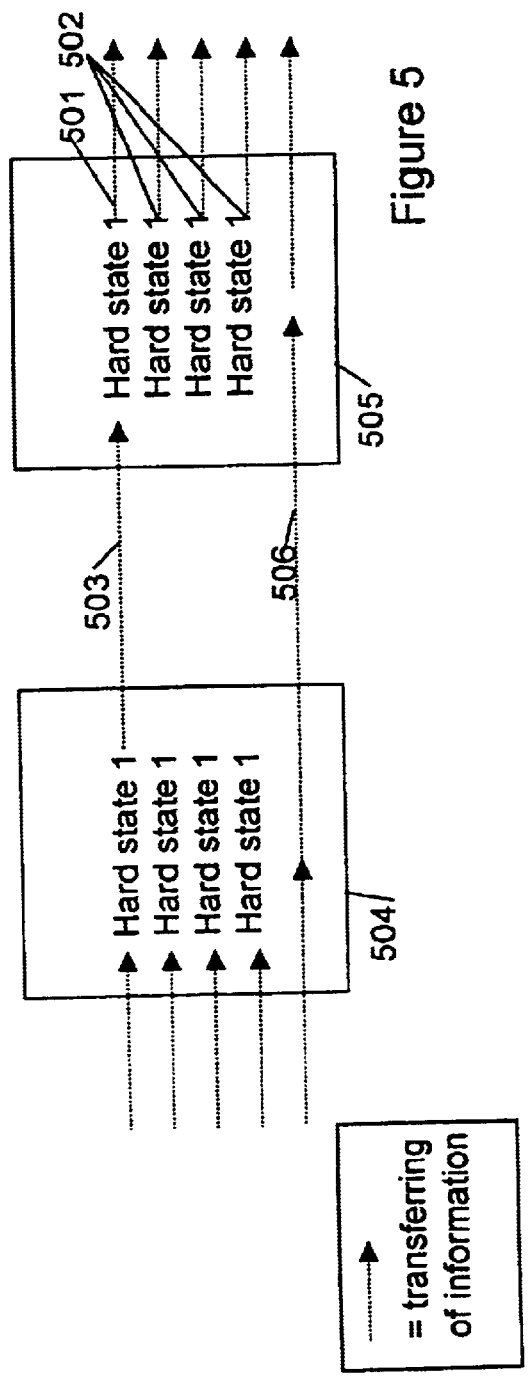

METHODS FOR EFFICIENT TRANSMISSION OF SIGNALING MESSAGES IN A PACKET-BASED NETWORK

This application claims priority under 35 U.S.C. §§119 and/or 365 to 9901893-9 filed in Sweden on May 21, 1999; the entire content of which is hereby incorporated by reference.

FIELD OF INVENTION

This invention relates to the field of IP (Internet Protocol) networks and more specifically to a method and arrangement for decreasing the amount of data transferred when signalling in an environment of bandwidth restrictions.

DESCRIPTION OF RELATED ART

TCP/IP (Transmission Control Protocol/Internet Protocol) Internet Protocol Suite is today a very commonly used protocol suite for communicating data and voice over IP networks. This protocol suite is optimised for wired connections, which have a relatively high transmission quality, a low latency and comparatively large bandwidth. However TCP/IP is not very efficient for transmitting data or voice over links with low bandwidth. Wireless links in e.g. mobile communication constitute examples of links with low bandwidth.

TCP/IP

In the TCP/IP Internet Protocol Suite the TCP is responsible for breaking up the message to be transmitted into datagrams i.e. a collection of submessages, reassembling the datagrams into the original message at the other end of the communications network, resending anything that gets lost, and arranging the message parts in the right order. An alternative to TCP is UDP (User Datagram Protocol) which sends the datagrams without any control of whether the datagram has arrived or not. This protocol is commonly used when sending voice over IP. The IP is responsible for routing individual. IP does not specify how the datagrams are related to each other. In order to keep track of details such as source and destination port numbers, datagram sequence number, checksums and other control data, TCP/UDP attaches a header to each datagram and hands over a combined header + datagram to IP. IP then adds its own header to this "TCP/UDP-header + datagram" so that the resulting packet of data appears to be "IP-header + TCP/UDP-header + datagram. In cases where the application is character-based, the headers can be 40 bytes or more long for each byte of data transferred. The words "datagram" and "packet" are often used interchangeably although "datagram" is correctly defined as a unit of data, and what the protocol deals with. However in some cases the TCP/IP datagram may be broken up into smaller pieces (e.g. if the datagram is comparatively big ) and another header appended to each smaller piece or "packet"

Header Compression

One way of solving the problem with bandwidth constraints is to decrease the amount of data to be transferred by means of so-called header compression.

In the past attempts have been made to develop specialised protocols which limit the overhead required in transmitting data over a local area network ("LAN") and to make use of certain inherent characteristics of a given network type to minimise the message overhead in a certain communication session. Message overhead is the header information, which is appended to the data portion of the message. Such header information is necessary to permit various portions of a network to keep track of the administrative and procedural tasks required to transfer data from one computer to another. One attempt to improve the efficiency of a protocol is the header compression methodology outlined in "Compressing TCP/IP headers for low-Speed Links" by V. Jacobsen, Network Working Group Request for comments: 1144, February 1990.

In this methodology the sender and the receiver keeps track of active connections. The receiver keeps a copy of the header from the last packet received from each connection. Compression is obtained by transferring only a small (<=8 bit) connection identifier of the part of the header that is constant over the connection together with the part of the header that has been changed. The receiver fills in the constant part from the saved header.

European Patent Application No. 0701354 describes an alternative way of using TCP/IP header compression. More specifically it shows a method for using header compression over X.25 networks.

When sending voice over IP over a radio link it is very important to make efficient use of the available bandwidth and spectrum. Sending voice over IP requires some signalling to set-up the connection and for monitoring the connection. This means further consumption of bandwidth. The same problem arises for all links with bandwidth constraints when packet based services are used, and which require signalling for establishing a connection e.g. satellite communications, cellular communications and wireless LAN. The header compression methodology is not optimised for this type of traffic and not sufficiently efficient.

Signalling traffic is different from other traffic in following aspects:

- Signalling messages are for set-up, release and control of a connection.
- Signalling messages are frequently transferred, often with a predictable frequency, during often used procedures, e.g. call-setup and call-release
- In some cases the signalling message is repeated, e.g. so-called keep-alive messages.

These characteristics for signalling messages motivates a new model for compression of redundant information, optimised for this kind of traffic. The present invention proposes a solution to this problem.

SUMMARY OF THE INVENTION

The present invention deals with the problem with packet based services consuming considerable bandwidth over links with shortage of bandwidth.

In situations with bandwidth constraints and where signalling is required for establishing the connection, e.g. voice over IP over radio links, the performance of the communication can be degenerated due to heavy signalling.

The object of the present invention is thus to reduce the amount of information in the signalling and thus save bandwidth.

The aforesaid problem is solved by means of a communication system wherein a signalling message is replaced by an indicator.

The following scenario of transferring a signalling message describes the inventive concept of the present invention.

After receiving a signalling message in a first node the signalling message is identified. The signalling message is replaced by an indicator, under usage of information from the identification, which indicator is transferred to a second node.

The second node restores the signalling message using the indicator.

An advantage of the present invention is that less information need to be transferred when transferring a signalling message.

Another advantage is that the whole signalling message, header and payload can be reduced by the present invention.

Another advantage is that less bandwidth is required when transferring a signalling message which means that the bandwidth can be used for other purposes e.g. user data traffic and other signalling messages.

Yet another advantage is that that the invention makes it possible to use packet based services which require signalling for establishing a connection where it before was impossible due to too low bandwidth.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 shows a sequence diagram over an embodiment of the proposed method.

FIG. 5 shows a sequence diagram over an embodiment of the proposed method.

DESCRIPTION OF PREFERED EMBODIMENTS

Figure 1:
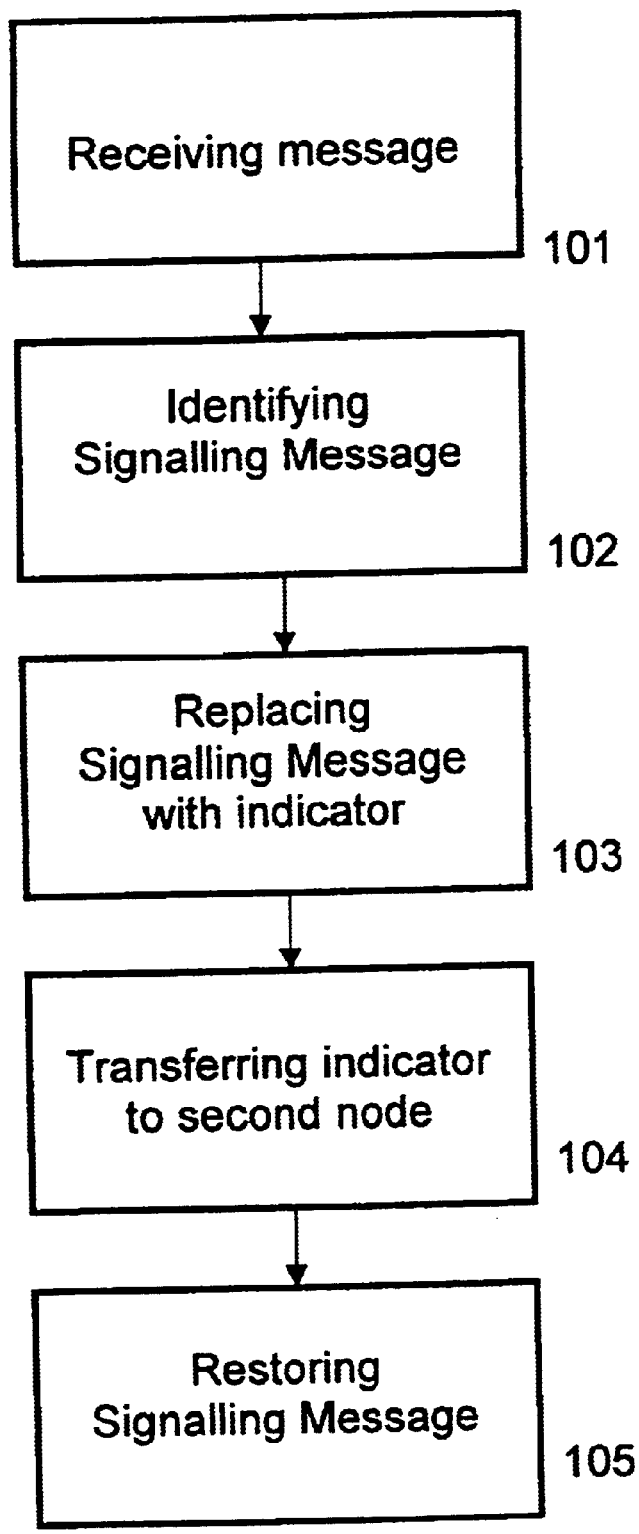
FIG. 1 shows a flowchart of the general method of the invention.

FIG. 1 shows a flowchart of a possible scenario of transferring a signalling message from a first node to a second node in a communication network, using the TCP/IP Internet Protocol Suite, where a signalling message is defined as a message pertaining to establishing, controlling, monitoring, and terminating a connection.

The method comprises the following steps:

101 A message is received in the first node which message is to be transferred to the second node.

102 The message is identified, e.g. as being a signalling message. A check is also performed to determine if the signalling message is registered in a storage in the node.

103 If the check finds that the signalling message is registered in the storage, an indicator replaces the signalling message. This indicator can be e.g. an identifier or an identifier and a signalling message, which will be described later.

104 The indicator is transferred to the second node.

105 The second node restores the signalling message by means of the indicator. This will also be described later.

Different embodiments of the invention will now be described more in detail.

By assigning a specific port number for all incoming signalling messages, the first node can check the port number and find out whether the incoming message is a signaling message. The port number is assigned in the UDP or TCP protocol.

Figure 2:
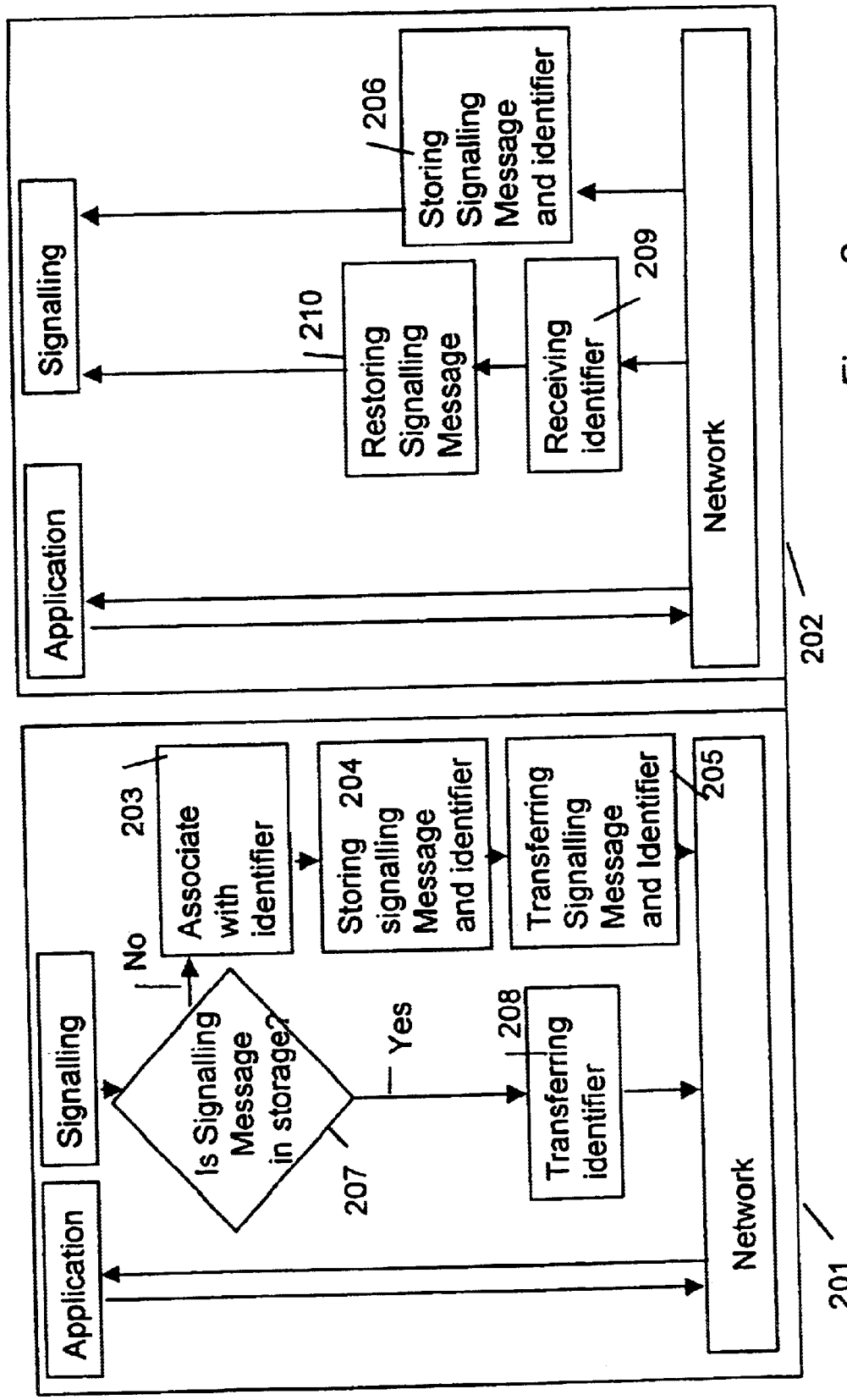
FIG. 2 shows an overview of signalling in the network.

FIG. 2 illustrates an embodiment of the inventive method being carried out if there are a number of signalling messages containing the same information value to be transferred, e.g. control parameters for a speech coder in a mobile phone call, from a first node (201) to a second node (202). A session is defined as a logic connection between two entities for exchange of data, e.g. a telephone call. The first signalling message is associated with an identifier (203). The identifier and the signalling message is then stored in a storage in the first node (204) and consequently sent to the second node (205). The identifier and the message here constitutes the indicator (103). The second node receives and stores the signalling message and its associated identifier in a storage in the second node (206). When the next signalling message is received at the first node, the first node identifies it by checking in the storage if it is a signalling message containing the same information as a previous signalling message, registered in the storage (207). If that is case, the node sends only the identifier to the second node (208), constituting the indicator (103). The second node receives the identifier (209), finds the signalling message associated to the identifier in the storage in the second node and thus restores the signalling message (210).

Figure 3:
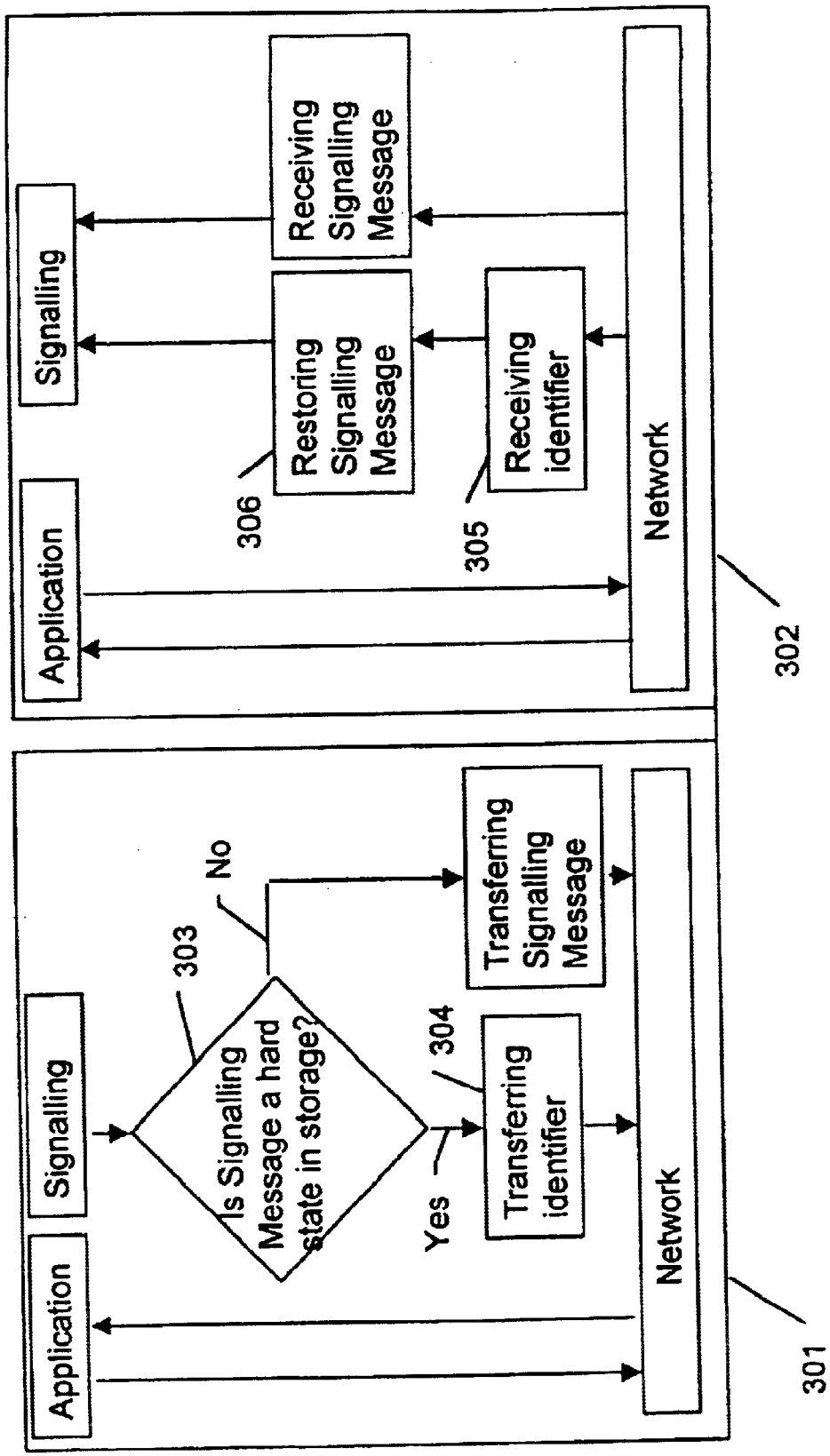
FIG. 3 shows an overview over signalling in the network where the nodes are pre-programmed with hard states.

FIG. 3 illustrates an embodiment of the inventive method being carried out if there are one or more signalling messages containing the same information that are frequently transferred during many sessions, e.g. maintenance of a connection, so-called keep-alive calls, from a first node (301) to a second node (302). The first node (301) and the second node (302) can, in that case, predefine a number of states, so-called hard states, each hard state being related to a specific signalling message. Each hard state is associated with an identifier. The hard state and the identifier are stored both in a storage in the first node (301) and in a storage in the second node (302).

When the a signalling message is received at the first node (301), the first node identifies it by checking in the storage if it is a signalling message corresponding to a predefined hard state which is registered in the storage (303). If it is, the node transfers (304) only the identifier to the second node (302), constituting the indicator (103). The second node (302) receives the identifier (305), finds the hard state associated to the identifier in the storage in the second node and thus restores the signalling message (306).

In one embodiment a first hard state (401) trigs a second hard state (402) which is shown in FIG. 4. If a sequence of different hard states is known e.g. in a call set-up, the different hard states of that sequence can be pre-programmed to trig the following hard state to start immediately or after a predefined interval. In this example the sequence contains four hard states. The first hard state is replaced by a first identifier when transferred (403) from the first node (404) to the second node (405). When the first hard state (401) is restored at the second node (405), it is predefined to trig a second hard state (402), either immediately or after a predefined interval, and the second hard state (402) is predefined to trig a third hard state (406). Then the third hard state (402) is predefined to trig a fourth hard state (407) which is predefined to not trig any more hard states. The first node is pre-programmed to not transfer information containing the identifier for the second, third and fourth hard state (402, 406, 407). It is also possible to break the sequence of hard states with a signalling message.

FIG. 5 illustrates an embodiment of the inventive method when a first hard state (501) is trigging a repetition of the first hard state (502). If it is known that the same hard state will be repeated a number of times, e.g. when bandwidth is allocated between the first and the second node, a signalling message has to be sent approximately each 30th second to keep the bandwidth open. The first hard state is replaced by a first identifier when transferred (503) from the first node (504) to the second node (505). When the first hard state (501) is restored at the second node (505), it is predefined to trig a repetition of the first hard state (502) within predefined intervals e.g. time intervals until a received signalling message (506) stops the repeating.

Figure 6:
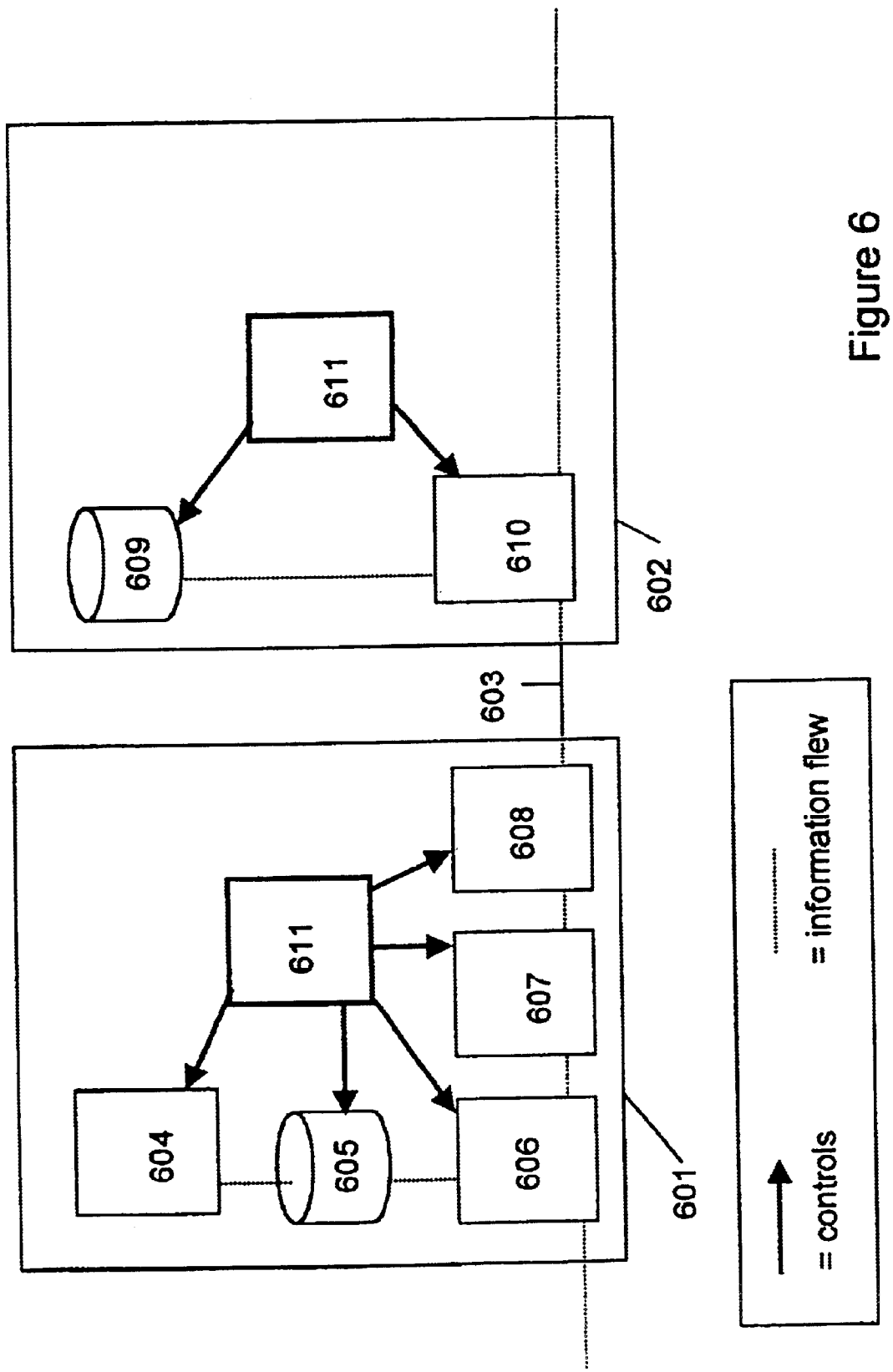
FIG. 6 illustrates an overview over a system according to the invention

FIG. 6 depicts a communication system according to the invention in which a signalling message can be transferred from a first node (601) to a second node (602) over a network, using the TCP/IP Internet Protocol Suite. The system comprises at least two nodes, the first node (601) and the second node which (602) are connected to each other over a Point to Point link (603). The first node has means for associating (604) a signalling message with an identifier and a storage (605) for storing signalling messages and their associated identifiers. The first node has means for identifying (606) a signalling message. One or more specific port numbers are assigned for all incoming signalling messages, to make it possible to sort out the signalling messages from other messages. A check in the storage (605) shows if an incoming signalling message is the same as one of the signalling messages registered in the storage (605). The first node also has means for replacing (607) a signalling message with its identifier and means for transferring (608) the identifier or the signalling message and its identifier to the second node. The second node has a storage (609) for storing the signalling message and its identifier when both a signalling message and its identifier is transferred and means for restoring (610) the signalling message if the identifier is transferred. The nodes have a CPU (Central Processor Unit) (611), controlling the units in the node.

In an embodiment the nodes (601, 602) have means for storing a number of predefined states, so-called hard states, each hard state being related to a specific signalling message, associated with an identifier. In a further embodiment the second node has means for triggering a second hard state via a first hard state and in an alternative embodiment the second node has means for triggering a repetition of a first hard state within predefined intervals. A further embodiment is to combine the two last-mentioned embodiments.

Figure 7:
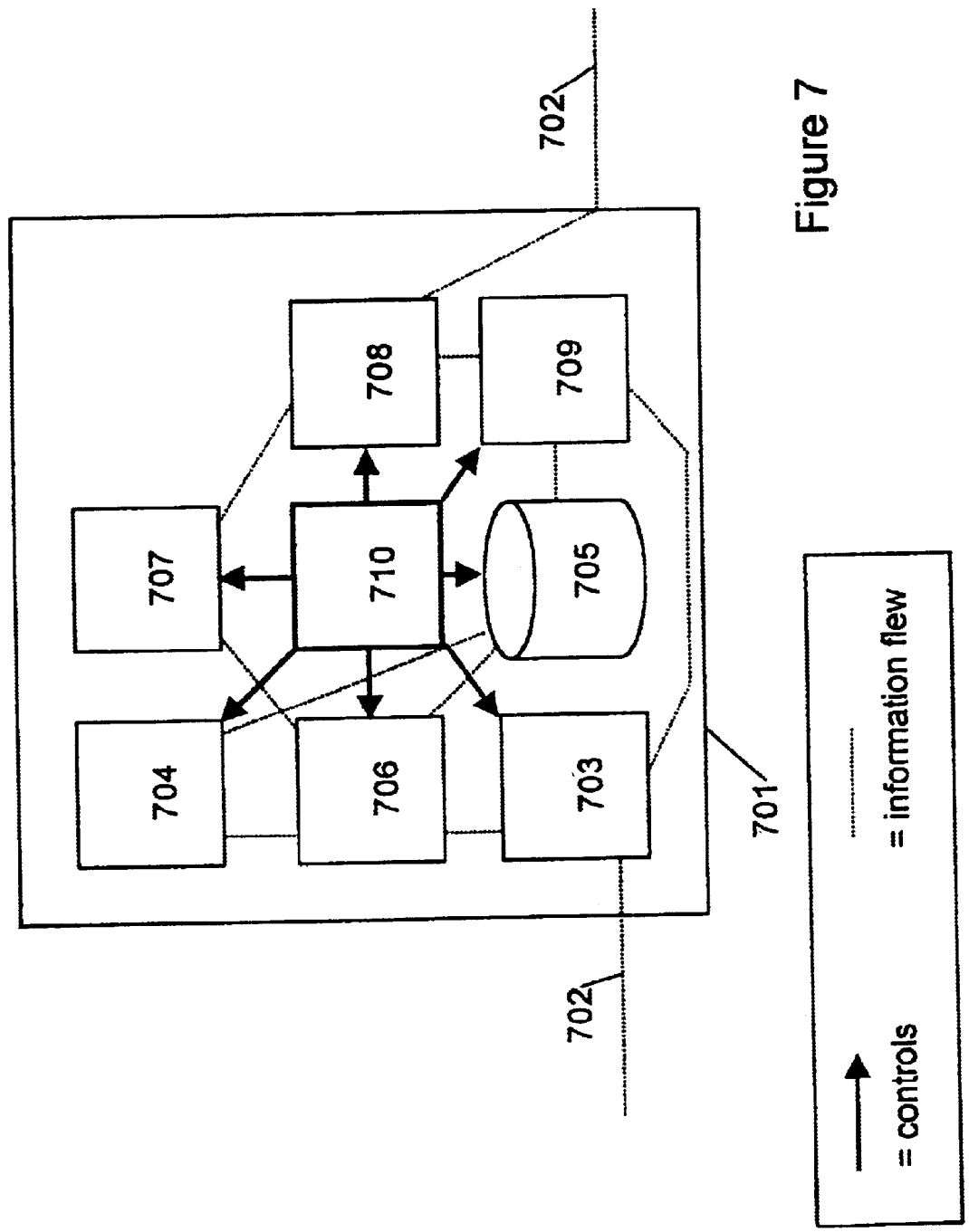
FIG. 7 illustrates an overview over a node according to the invention

FIG. 7 shows a node (701) in a communication system according to the invention in which a signalling message can be transferred. The node (701) is a unit in a network, using the TCP/IP Internet Protocol Suite. The node (701) is connected to at least one other node over a Point to Point link (702). The node has means for receiving signalling messages (703) and means for associating (704) an identifier with the signalling message. In a storage (705) within the node, signalling messages and their associated identifiers are stored. The node has means for identifying (706) a signalling message. A specific port number is assigned for incoming signalling messages, to make it possible to distinguish the signalling messages from other messages and check in the storage (705) if an incoming signalling message is the same as one of the signalling messages already registered in the storage (705). The node has also means for replacing (707) a signalling message with its identifier and means for transferring (708) the identifier or the signalling message and its identifier to another node. The node has means for restoring (709) an in-coming signalling message from its identifier whenever a signalling message has been replaced. The node has a CPU (Central Processor Unit) (710), controlling the units in the node.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A method for managing a Voice over IP (VoIP) communication through a packet-based network, wherein said VoIP communication requires the transmission of packets having a header portion and a payload portion, said payload portion containing data associated with said communication and signaling messages utilized to establish, maintain or terminate said VoIP communication, said packets being transmitted from a first node to a second node, said method comprising the steps of:

receiving a packet at the first node;

if said packet is received at a predefined port of said first node, identifying said packet as containing a signaling message;

replacing the signaling message within the payload portion of said packet with an indicators, wherein said indicator comprises fewer bits that said signaling message and functions as a proxy for said signaling message;

transmitting the packet to the second node; and restoring the signaling message in the second node by means of the indicator, whereby the bandwidth of the transmission link between said first and second nodes is more efficiently utilized.

2. The method according to claim 1, further comprising the steps of:

associating a first signaling message with an identifier;

storing the first signaling message and the associated identifier in a storage in the first node;

transferring the first signaling message and the associated identifier, constituting the indicator, to the second node;

storing the first signaling message and the associated identifier in a storage in the second node.

3. The method according to claim 2, wherein the signaling message comprises substantially the same information as the first signaling message, the method further comprising the steps of:

finding the identifier associated with the first signaling message in the storage in the first node;

transferring the associated identifier, constituting the indicator, to the second node;

restoring the signaling message by means of the associated identifier and the storage in the second node.

4. The method according to claim 1, prior to receiving then first signaling message, further comprising the steps of:

predefining a number of hard states, where each hard state is related to a specific signaling message;

associating each hard state with a unique identifier;

storing the hard states and their associated identifiers in a storage in the first node and in a storage in the second node.

5. The method of claim 4, wherein the received signaling message is one of the predefined hard states, said method further comprising the steps of:

finding the identifier associated with the related hard state in the storage in the first node;

transferring the associated identifier, constituting the indicator, to the second node;

restoring the signaling message by means of the associated identifier and the storage in the second node.

6. The method according to claim 5, after the transferring step, further comprising the step of:

the first hard state triggering a second hard state.

7. The method according to claim 5, after the transferring step, further comprising the steps of:

the first hard state triggering a repetition of the first hard state within predefined time intervals; and receiving a signaling message that stops the repeating of the first hard state.

* * * * *

UNITED STATES PATENT AND TRADEMARK OFFICE
CERTIFICATE OF CORRECTION

PATENT NO. : 6,785,731 B1 Page 1 of 1
APPLICATION NO. : 09/574242
DATED : August 31, 2004
INVENTOR(S) : Westberg et al.

It is certified that error appears in the above-identified patent and that said Letters Patent is hereby corrected as shown below:

In Column 3, Lines 4-5, delete paragraph "The second node ………… indicator." and insert the same paragraph on Line 3, after "node.".

In Column 6, Line 33, in Claim 1, delete "indicators," and insert -- indicator, --, therefor.

In Column 6, Line 34, in Claim 1, delete "that" and insert -- than --, therefor.

In Column 6, Line 64, in Claim 4, delete "then" and insert -- the --, therefor.

Signed and Sealed this

Second Day of September, 2008

JON W. DUDAS
*Director of the United States Patent and Trademark Office*